(12) United States Patent
Zhu et al.

(10) Patent No.: US 10,310,504 B2
(45) Date of Patent: Jun. 4, 2019

(54) DRIVERLESS VEHICLE CONTROL METHOD, APPARATUS AND SYSTEM

(71) Applicant: Baidu Online Network Technology (Beijing) Co., Ltd., Beijing (CN)

(72) Inventors: Zhenguang Zhu, Beijing (CN); Tianlei Zhang, Beijing (CN); Yuchang Pan, Beijing (CN)

(73) Assignee: BAIDU ONLINE NETWORK TECHNOLOGY (BEIJING) CO, LTD., Beijing (CN)

( * ) Notice: Subject to any disclaimer, the term of this patent is extended or adjusted under 35 U.S.C. 154(b) by 131 days.

(21) Appl. No.: 15/283,040

(22) Filed: Sep. 30, 2016

(65) Prior Publication Data

US 2017/0344005 A1  Nov. 30, 2017

(30) Foreign Application Priority Data

May 26, 2016  (CN) .......................... 2016 1 0362335

(51) Int. Cl.
  *G05D 1/00* (2006.01)
  *H04L 29/08* (2006.01)
  *H04L 29/06* (2006.01)
  *B60W 30/00* (2006.01)

(52) U.S. Cl.
  CPC ........... *G05D 1/0088* (2013.01); *B60W 30/00* (2013.01); *G05D 1/0022* (2013.01); *H04L 67/12* (2013.01); *H04L 67/125* (2013.01); *H04L 69/08* (2013.01); *G05D 2201/0213* (2013.01)

(58) Field of Classification Search
  CPC .............................. G05D 1/0088; H04L 67/12
  USPC .......................................................... 701/23
  See application file for complete search history.

(56) References Cited

U.S. PATENT DOCUMENTS

2015/0348335 A1* 12/2015 Ramanujam ........... G07C 5/006
                                                              701/23
2016/0232790 A1*  8/2016 Massey ................. B60W 30/08

FOREIGN PATENT DOCUMENTS

CN        103684963 A      3/2014

* cited by examiner

*Primary Examiner* — Muhammad Shafi
(74) *Attorney, Agent, or Firm* — Knobbe Martens Olson & Bear LLP

(57) ABSTRACT

Disclosed embodiments include a driverless vehicle control method, apparatus and system. In some embodiments, method comprises: receiving a vehicle control message of a driverless vehicle, the vehicle control message used to represent vehicle control characteristics of the driverless vehicle; converting the vehicle control message to a vehicle control protocol message, the vehicle control protocol message used to implement a general instruction description for the vehicle control message; generating a vehicle control command based on the vehicle control protocol message; and converting the vehicle control command to a vehicle control instruction corresponding to the vehicle control message, and sending the vehicle control instruction to the driverless vehicle. In this way, the vehicle control message can be described by using a general message instruction, achieving the objective of controlling the driverless vehicle by using a general message instruction.

8 Claims, 5 Drawing Sheets

DRIVERLESS VEHICLE CONTROL METHOD, APPARATUS AND SYSTEM

CROSS-REFERENCE TO RELATED APPLICATIONS

This application is related to and claims priority from Chinese Application No. 201610362335.7, filed on May 26, 2016, entitled "DRIVERLESS VEHICLE CONTROL METHOD, APPARATUS AND SYSTEM", the entire disclosure of which is hereby incorporated by reference.

TECHNICAL FIELD

The present application relates to the field of data processing technology, specifically to the field of driverless vehicle information processing technology, and more specifically to a driverless vehicle control method, apparatus and system.

BACKGROUND

Vehicles have extended travel reach, provided travel convenience, and improved the quality of life. With the development of science and technology, compared with a manually driven vehicle, an unmanned vehicle (referred to as a driverless vehicle below) controlled by an intelligent system can acquire more driving information and provide higher security. Driverless vehicles become an important development trend of future vehicles.

However, the existing driverless vehicle control method has some defects. For example, various existing driverless vehicle manufacturers, based on their own circumstances, control their driverless vehicles by using self-defined vehicle control messages. Generally, the manufacturers are not capable of developing all parts of a driverless vehicle, and some parts need to be developed by other more specialized vehicle manufacturers. Therefore, vehicle control messages defined by one driverless vehicle manufacturer form a technical barrier to other vehicle-related technology companies. This is disadvantageous for further developments of driverless vehicles.

SUMMARY

Some embodiments of the present application provide a driverless vehicle control method, apparatus and system, in order to solve the technical problem mentioned in the foregoing Background section.

In the first aspect, some embodiments of the present application provide a driverless vehicle control method, comprising: receiving a vehicle control message of a driverless vehicle, the vehicle control message used to represent vehicle control characteristics of the driverless vehicle; converting the vehicle control message to a vehicle control protocol message, the vehicle control protocol message used to implement a general instruction description for the vehicle control message; generating a vehicle control command based on the vehicle control protocol message; and converting the vehicle control command to a vehicle control instruction corresponding to the vehicle control message, and sending the vehicle control instruction to the driverless vehicle.

In some embodiments, the converting the vehicle control message to a vehicle control protocol message comprises: parsing the vehicle control message to obtain a message information file, the message information file comprising message content information and signal information; and inputting the message information file and a target code frame template to a code generator, to obtain a vehicle control protocol message corresponding to the message information file, the target code frame template used to convert a code format of the message information file to a target code format, and the code generator used to implement mutual conversion between the message information file and the vehicle control protocol message.

In some embodiments, the parsing the vehicle control message to obtain a message information file comprises: detecting a file format of the vehicle control message; and decoding the file format to obtain the message information file corresponding to the vehicle control message.

In some embodiments, the method further comprises generating the code generator, comprising: acquiring a vehicle control message of the driverless vehicle, and parsing the vehicle control message to obtain a message information file; determining vehicle physical control information of the message information file; converting the vehicle physical control information to a message code in a designated format by using a target code frame template, the message code used to construct the vehicle control protocol message; and establishing a corresponding relationship between the message information file and the message code, to obtain the code generator.

In some embodiments, attributes of the message code comprise at least one of an encoding type, a variable type, a data type, a data offset and a data resolution.

In the second aspect, some embodiments of the present application provide a driverless vehicle control apparatus, comprising: a vehicle control message receiving unit, for receiving a vehicle control message of a driverless vehicle, the vehicle control message used to represent vehicle control characteristics of the driverless vehicle; a vehicle control protocol message converting unit, for converting the vehicle control message to a vehicle control protocol message, the vehicle control protocol message used to implement a general instruction description for the vehicle control message; a vehicle control command generating unit, for generating a vehicle control command based on the vehicle control protocol message; and a vehicle control unit, for converting the vehicle control command to a vehicle control instruction corresponding to the vehicle control message, and sending the vehicle control instruction to the driverless vehicle.

In some embodiments, the vehicle control protocol message converting unit comprises: a message information file acquiring sub-unit, for parsing the vehicle control message to obtain a message information file, the message information file comprising message content information and signal information; and a vehicle control protocol message converting sub-unit, for inputting the message information file and a target code frame template to a code generator, to obtain a vehicle control protocol message corresponding to the message information file, the target code frame template used to convert a code format of the message information file to a target code format, and the code generator used to implement mutual conversion between the message information file and the vehicle control protocol message.

In some embodiments, the message information file acquiring sub-unit comprises: a format detecting module, for detecting a file format of the vehicle control message; and a decoding module, for decoding the file format to obtain the message information file corresponding to the vehicle control message.

In some embodiments, the apparatus further comprises a code generator generating unit, for generating a code generator, comprising: a parsing sub-unit, for acquiring a vehicle control message of the driverless vehicle, and parsing the vehicle control message to obtain a message information file; a vehicle physical control information acquiring sub-unit, for determining vehicle physical control information of the message information file; a message code converting sub-unit, for converting the vehicle physical control information to a message code in a designated format by using a target code frame template, the message code used to construct the vehicle control protocol message; and a code conversion template generating sub-unit, for establishing a corresponding relationship between the message information file and the message code, to obtain the code generator.

In some embodiments, attributes of the message code comprises at least one of an encoding type, a variable type, a data type, a data offset, and a data resolution.

In the third aspect, some embodiments of the present application provide a driverless vehicle control system, and the system comprises the driverless vehicle control apparatus in the second aspect.

In the driverless vehicle control method, apparatus and system provided in some embodiments of the present application, a vehicle control message of a driverless vehicle is acquired. The vehicle control message is converted to a vehicle control protocol message, so that the vehicle control message can be described by using a general message instruction. A vehicle control command is generated based on the vehicle control protocol message. The vehicle control command is converted to a vehicle control instruction corresponding to the vehicle control message, and the vehicle control instruction is sent to the driverless vehicle. Therefore, the objective of controlling the driverless vehicle by using a general message instruction is achieved.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
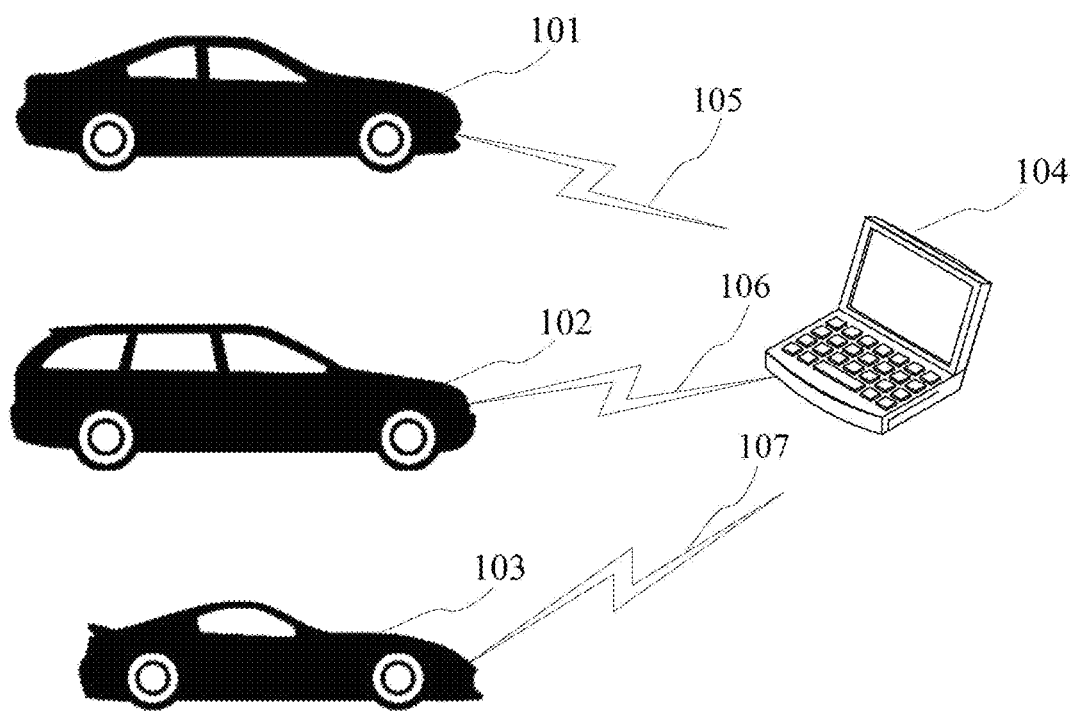
FIG. 1 is an architectural diagram of a system in which some embodiments of the present application may be implemented.

FIG. 1 shows an system architecture 100 which may be used by an embodiment of a driverless vehicle control method or a driverless vehicle control apparatus of the present application.

As shown in FIG. 1, the system architecture 100 may include driverless vehicles 101, 102 and 103, networks 105, 106, and 107, and a vehicle control device 104. The driverless vehicles 101, 102 and 103 are connected to the vehicle control device 104 via the networks 105, 106, and 107, which can be a wired or wireless manner. A code generator included in the vehicle control device 104 converts vehicle control messages of the driverless vehicles 101, 102 and 103 to vehicle control protocol messages, and then generates vehicle control commands based on the vehicle control protocol messages. The code generator included in the vehicle control device 104 converts the vehicle control commands to vehicle control instructions corresponding to the vehicle control messages. The vehicle control device 104 sends the vehicle control instructions to the driverless vehicles via the networks 105, 106, and 107, to control the driverless vehicles.

The driverless vehicle 101, 102, 103 may comprise an information sending device and a receiving device. The sending device can send state information of the driverless vehicle 101, 102, 103 to the vehicle control device 104. The receiving device receives the vehicle control instruction sent from the vehicle control device 104, and sends the vehicle control instruction to processors of the driverless vehicle 101, 102, 103. In this way, the driverless vehicle 101, 102, 103 can be controlled by the vehicle control device 104.

The vehicle control device 104 may be a server configured to generate a vehicle control command, for example, a server receiving the vehicle control protocol message sent by the driverless vehicle 101, 102, 103, and generating the vehicle control command according to the vehicle control protocol message.

It should be noted that, the driverless vehicle control method provided in the embodiments of the present application is generally executed by the vehicle control device 104. Correspondingly, the driverless vehicle control apparatus is generally disposed in the vehicle control device 104.

It should be understood that the numbers of the driverless vehicles and the vehicle control devices in FIG. 1 are merely illustrative. Any number of driverless vehicles and vehicle control devices may be provided based on the actual requirements.

Figure 2:
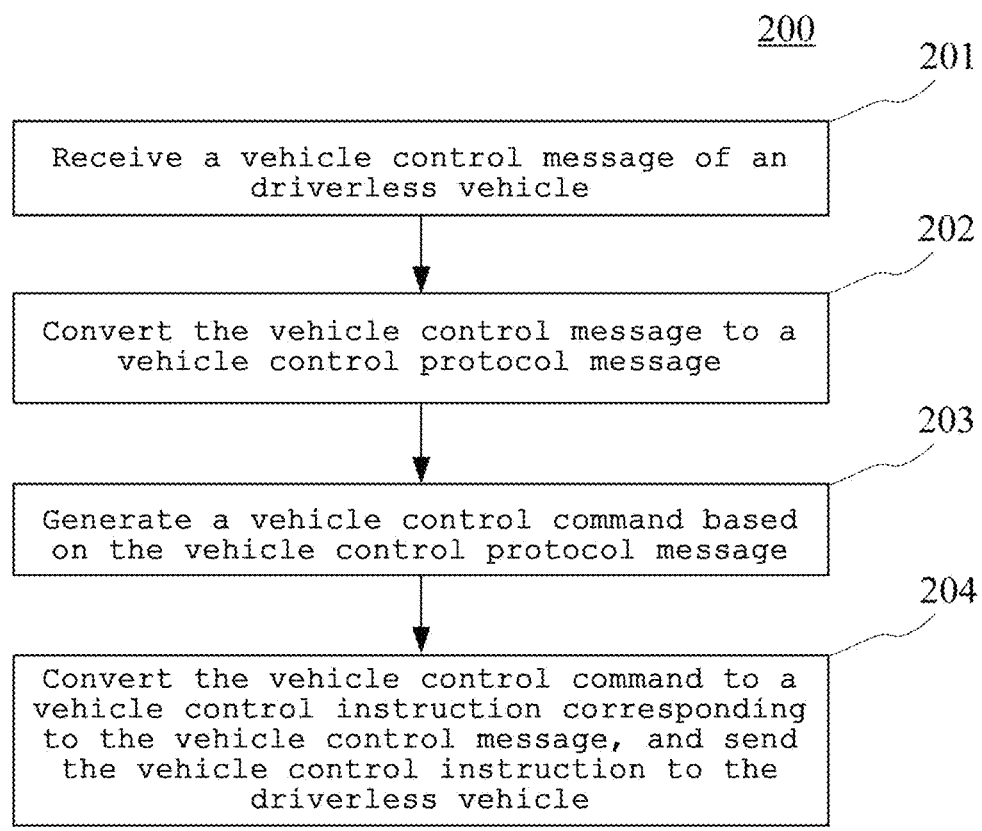
FIG. 2 is a flowchart of an embodiment of a driverless vehicle control method according to some embodiments of the present application.

Further referring to FIG. 2, it shows a flowchart 200 of an embodiment of a driverless vehicle control method. The driverless vehicle control method comprises the following steps:

Step 201: receiving a vehicle control message of a driverless vehicle.

The vehicle control message is used to represent vehicle control characteristics of the driverless vehicle.

The driverless vehicle (that is, the unmanned vehicle) collects vehicle data and road data through various sensors, and processes the collected data by using a processor to obtain various instructions for controlling the vehicle. Various execution components of the driverless vehicle perform corresponding adjustment after receiving the instructions, to control the driving of the driverless vehicle. Currently, there are many companies researching driverless vehicles, especially vehicle manufacturers. The vehicle manufacturers can easily implement driverless reformation on their vehicles by means of their advantages. For example, the vehicles manufactured by some foreign vehicle manufacturers can switch freely between a driver mode and a driverless mode, and a control instruction can be sent to the driverless vehicle in the driverless mode so that the driverless vehicle drives according to certain parameters.

Currently, control messages executed by the driverless vehicle are mostly controller area network (CAN) control messages. The CAN is a serial communication protocol bus for real-time application, which can transmit signals by using a twisted pair, and is one of field buses most widely used in the world. The CAN protocol is used for communication between various elements in the vehicle, so as to replace expensive and bulky distribution wire bundles. Characteristics of the CAN protocol comprise complete serial data communication, real-time support, transmission rate being up to 1 Mbps, and capabilities of 11-bit addressing and error detecting at the same time.

Driverless vehicles manufactured by different driverless vehicle manufacturers adopt different devices, and have different vehicle performances and indexes that need to be achieved. Therefore, the controller area network bus control messages and the state messages of driverless vehicles manufactured by different driverless vehicle manufacturers are usually different. This increases the difficulty in developing driverless vehicle techniques by other driverless vehicle development teams, and is disadvantageous for the development of driverless vehicle technologies.

The controller area network bus control message and the state message of the driverless vehicle are generally designed by using special software. The software finally generates a file in a format, and the file in this format generally has a particular information rule. The specific operation information of the controller area network bus control message and the state message of the driverless vehicle may be acquired by parsing the file in this format. Therefore, the controller area network bus control message of the driverless vehicle and the state message of the driverless vehicle, that is, the vehicle control message of the driverless vehicle, need to be received first.

Step 202, converting the vehicle control message to a vehicle control protocol message.

The vehicle control message is used for communication between various execution components of the driverless vehicle. It can be known from the above description that, the vehicle control message may be a file in a specific format, and a technician usually cannot directly acquire a related driverless vehicle control instruction from the file in this format. Therefore, it needs to convert the vehicle control message to a vehicle control protocol that is directly readable by a technician. That is to say, the vehicle control protocol message is used for implementing a general instruction description for the vehicle control message. This can greatly reduce the technical barrier of driverless vehicle control, and improve the operability of the driverless vehicle.

In some alternative implementations of this embodiment, the converting the vehicle control message to a vehicle control protocol message may comprise the following steps:

First step, parsing the vehicle control message to obtain a message information file.

The message information file, that is, a file included in the vehicle control message, may be obtained by parsing the vehicle control message according to the format of the vehicle control message. The message information file generally comprises message content information and signal information. The message content information is the specific content of the vehicle control message. The signal information is information such as a control protocol identification corresponding to the message content information.

Second step, inputting the message information file and a target code frame template to a code generator, to obtain a vehicle control protocol message corresponding to the message information file.

Although the message information file is obtained by parsing the vehicle control message, it is not a common instruction file. Therefore, the message information file needs to be converted to a vehicle control protocol message in a common format. The specific format of the vehicle control protocol message may be determined through the target code frame template. The target code frame template is used for converting a code format of the message information file to a target code format. According to requirements, the target code frame template may convert the message information file in accordance with to a specific file format. The code generator is used for implementing mutual conversion between the message information file and the vehicle control protocol message. That is, the code generator can convert the message information file to a vehicle control protocol message in a format corresponding to the target code frame template by using the target code frame template.

In some alternative implementations of this embodiment, the parsing the vehicle control message to obtain a message information file comprises:

First step, detecting a file format of the vehicle control message.

The vehicle control message may be in various different file formats. In order to parse the vehicle control message, it needs to firstly determine the file format of the vehicle control message. The conventional vehicle control message may be a file in a dbc format, or a file in another format.

Second step, decoding the file format to obtain the message information file corresponding to the vehicle control message.

After the file format of the vehicle control message is determined, the vehicle control message may be parsed to obtain a message information file through a corresponding file decoder.

In some alternative implementations of this embodiment, the above method of this embodiment further comprises generating a code generator, which may comprise the following steps:

First step, acquiring a vehicle control message of the driverless vehicle, and parsing the vehicle control message to obtain a message information file.

This step is similar to the above step of parsing the vehicle control message to obtain the message information file, and will be omitted here. It should be noted that, in order to obtain an accurate code generator, this step acquires all vehicle control messages of the driverless vehicle.

Second step, determining vehicle physical control information of the message information file.

The message information file is a file performing information delivery from a processor of a driverless vehicle to an execution component of the driverless vehicle or information delivery between execution components of the driverless vehicle. The message information file is used to actually control the driving of the driverless vehicle. Accordingly, the message information file comprises driving parameters for controlling the driverless vehicle, that is, the message information file comprises vehicle physical control information. In order to accurately convert the vehicle control message to the vehicle control protocol message, it firstly needs to determine the vehicle physical control information included in the message information file. The control content information comprises a control protocol identification, a control protocol names and control protocol content.

Third step, converting the vehicle physical control information to a message code in a designated format by using a target code frame template.

It can be known from the above description that, the target code frame template is used for converting the code format of the message information file to a target code format, and is a frame set according to a specific code format. After the file is imported to the target code frame template, a code format file corresponding to the target code frame template may be obtained. The message code is used for constructing the vehicle control protocol message. The attributes of the message code comprise at least one of an encoding type, a variable type, a data type, a data offset, and a data resolution.

Fourth step, establishing a corresponding relationship between the message information file and the message code, to obtain the code generator.

After the vehicle physical control information is converted to a message code in a designated format by using a target code frame template, a corresponding relationship between the message information file and the message code may be established. The code generator is obtained according to the corresponding relationship.

Step 203, generating a vehicle control command based on the vehicle control protocol message.

From the vehicle control protocol message, current state information of the driverless vehicle may be acquired. In order to control the driverless vehicle, a vehicle control command may be generated according to the vehicle control protocol message. This greatly improves the diversity of controlling the driverless vehicle, and is advantageous for developing the performance of the driverless vehicle and control techniques of the driverless vehicle. The vehicle control command is used for controlling the driverless vehicle.

Step 204, converting the vehicle control command to a vehicle control instruction corresponding to the vehicle control message, and sending the vehicle control instruction to the driverless vehicle.

The vehicle control command has a file format similar to that of the vehicle control protocol message, and cannot be directly applied to the driverless vehicle. Therefore, it needs to convert the vehicle control command to a vehicle control instruction executable by the driverless vehicle, and then to send the vehicle control instruction to the driverless vehicle for execution. The process of converting the vehicle control command to the vehicle control instruction is similar to the above process of converting the vehicle control instruction to the vehicle control command, and is not repeated here.

Figure 3:
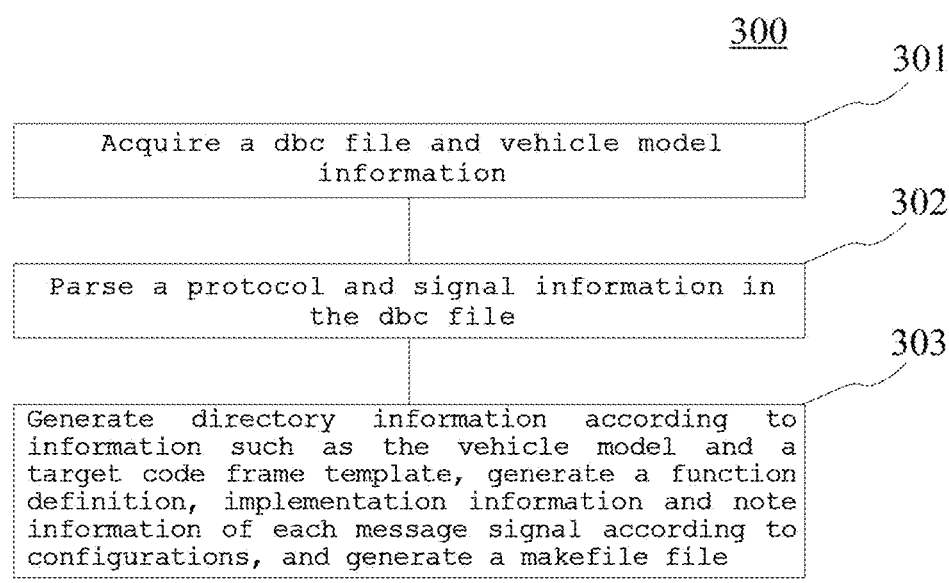
FIG. 3 is a flowchart of an application scenario of a driverless vehicle control method according to some embodiments of the present application.

FIG. 3 is a flowchart of an application scenario of a driverless vehicle control method according to this embodiment. After a file (that is, the vehicle control message) in a dbc (DataBase Commander, database container file) format of the driverless vehicle and vehicle model information of the driverless vehicle are acquired, protocol and signal information in the file in the dbc format are parsed.

The obtained information comprises: a protocol identification, a protocol name, and detailed information of each signal in the protocol. The protocol identification is used for indicating a controller area network bus control message of the driverless vehicle, that is, each driverless vehicle has a protocol identification. The protocol name is a name for a function or attribute of the protocol itself, and is mainly used for prompting the function or attribute of the protocol. The detailed information of each signal in the protocol is a detailed description of each signal, comprising: a) an encoding manner: Intel encoding or Motorola encoding; b) an initial bit: an initial bit according to Intel encoding or Motorola encoding; c) signal occupation bit length: the number of bits occupied by the signal; signal occupation bit length: the number of bits occupied by the signal; d) whether it is a numerical signal having a sign: whether a numerical value stored in the bit is positive or negative; e) a signal name: the name of the signal; f) a signal offset: an offset value when the bit signal is converted to a physical value; g) a signal resolution: a precision of the bit signal when it is converted to a physical value; h) a signal physical value range: a physical value range of the signal; i) a signal physical value unit: a physical unit of the signal; j) a type in a signal process: for example, whether it is a shaping numerical value or a floating numerical value. Then, directory information of the driverless vehicle is generated according to the vehicle model information, the target code frame template and the like, thereby obtaining a function definition of a message signal, information that needs to be implemented, and note information. Finally, a makefile file is generated (the makefile file is used to store parameter options of a compiler and a connector, and further expresses relationship between all source files). The makefile file belongs to an "automatically complied" file. After the makefile file is obtained, all vehicle control messages can be complied, thereby improving the efficiency of acquiring the vehicle control protocol message.

During an actual operation, the step of the makefile file may comprise:

First step, generating a corresponding code file folder according to the vehicle model information and the frame template.

For example, the vehicle type file folder may comprise: a message file folder (a generated control code and a read state code); a message management file folder (a module packaging all messages); a test file folder (a file folder for testing control and feedback signal logic); and a master control program file folder (a general vehicle control file folder module is accomplished by using the packaged message module). The message codes (the control code and state parsing code) are generated by a kernel module, and others may be generated by using a fixed code template.

Second step, generating a .h file and a .cpp file corresponding to each protocol in the corresponding file folder according to a configuration file of the protocol (that is, generating a corresponding head file and implementation file according to configuration parameters of each signal in the protocol).

When each signal is written into a byte or a signal is parsed to obtain a physical value meaning, definition and implementation of a signal parsing function are performed according to a signal encoding type, a signal program variable type, presence of a sign or not, a signal offset, and a signal resolution. For example, taking a steering wheel rotation angle control signal and a feedback signal as examples, dbc signal configuration files obtained by parsing are shown in Table 1.

TABLE 1

| Configuration Information | Steering Wheel Control Signal | Steering Wheel Feedback |
|---|---|---|
| Encoding format | Motorola | Motorola |
| Initial bit | 7 | 7 |

TABLE 1-continued

| Configuration Information | Steering Wheel Control Signal | Steering Wheel Feedback |
|---|---|---|
| Signal occupation bit | 16 | 16 |
| Whether it is a signal having a sign | Yes | Yes |
| Signal name | ctl_steer_angle | steer_angle |
| Signal resolution | 0.1 | 0.1 |
| Signal offset | −720 | −720 |
| Signal physical value range | [−540, 540] | [−540, 540] |
| Signal physical value unit | Degree | Degree |
| Type of the signal in a target code | int | int |

Third step, for the generated target code frame template, a corresponding Makefile file may also be automatically generated according to the automatically generated file name and a fixed dependence. This facilitates repeated compiling and construction for protocol codes.

In some embodiments of the present application, a vehicle control message of a driverless vehicle is acquired, the vehicle control message is converted to a vehicle control protocol message, so that the vehicle control message can be described by using a general message instruction; a vehicle control command is generated based on the vehicle control protocol message, the vehicle control command is converted to a vehicle control instruction corresponding to the vehicle control message, and the vehicle control instruction is sent to the driverless vehicle. Therefore, the objective of controlling the driverless vehicle by using a general message instruction can be achieved.

Figure 4:
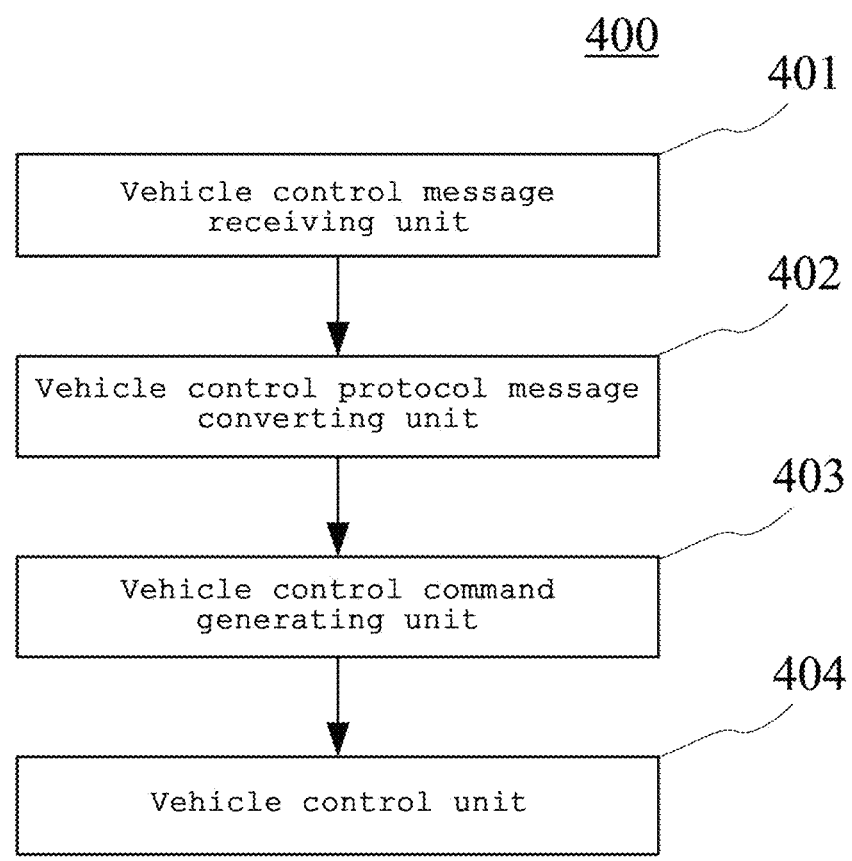
FIG. 4 is a schematic structural diagram of an embodiment of a driverless vehicle control apparatus according to the present application.

Further referring to FIG. 4, as an implementation of the methods shown in the above Figures, the present application provides an embodiment of a driverless vehicle control apparatus. The apparatus embodiment corresponds to the method embodiment shown in FIG. 2.

As shown in FIG. 4, the driverless vehicle control apparatus 400 in this embodiment comprises: a vehicle control message receiving unit 401, a vehicle control protocol message converting unit 402, a vehicle control command generating unit 403, and a vehicle control unit 404. The vehicle control message receiving unit 401 is configured to receive a vehicle control message of a driverless vehicle, and the vehicle control message is used to represent vehicle control characteristics of the driverless vehicle. The vehicle control protocol message converting unit 402 is configured to convert the vehicle control message to a vehicle control protocol message, and the vehicle control protocol message is used to implement a general instruction description for the vehicle control message. The vehicle control command generating unit 403 is configured to generate a vehicle control command based on the vehicle control protocol message. The vehicle control unit 404 is configured to convert the vehicle control command to a vehicle control instruction corresponding to the vehicle control message, and send the vehicle control instruction to the driverless vehicle.

In some alternative implementations of this embodiment, the vehicle control protocol message converting unit 402 comprises: a message information file acquiring sub-unit (not shown) and a vehicle control protocol message converting sub-unit (not shown). The message information file acquiring sub-unit (not shown) is configured to parse the vehicle control message to obtain a message information file, and the message information file comprises message content information and signal information. The vehicle control protocol message converting sub-unit is configured to input the message information file and a target code frame template to a code generator, to obtain a vehicle control protocol message corresponding to the message information file. The target code frame template is used to convert a code format of the message information file to a target code format, and the code generator is used to implement mutual conversion between the message information file and the vehicle control protocol message.

In some alternative implementations of this embodiment, the message information file acquiring sub-unit comprises: a format detecting module (not shown) and a decoding module (not shown). The format detecting module is configured to detect a file format of the vehicle control message. The decoding module is configured to decode the file format to obtain the message information file corresponding to the vehicle control message.

In some alternative implementations of this embodiment, the control apparatus 400 for the driverless vehicle of this embodiment further comprises: a code generator generating unit (not shown), configured to generate a code generator. The code generator generating unit comprises: a parsing sub-unit (not shown), a vehicle physical control information acquiring sub-unit (not shown), a message code converting sub-unit (not shown), and a code conversion template generating sub-unit (not shown). The parsing sub-unit is configured to acquire a vehicle control message of the driverless vehicle, and parse the vehicle control message to obtain a message information file. The vehicle physical control information acquiring sub-unit is configured to determine vehicle physical control information of the message information file, and the control content information comprises a control protocol identification, a control protocol name, and control protocol content. The message code converting sub-unit is configured to convert the vehicle physical control information to a message code in a designated format by using a target code frame template, and the message code is used to construct a vehicle control protocol message. The code conversion template generating sub-unit is configured to establish a corresponding relationship between the message information file and the message code, to obtain the code generator.

In some alternative implementations of this embodiment, attributes of the message code comprises at least one of an encoding type, a variable type, a data type, a data offset, and a data resolution.

This embodiment further provides a driverless vehicle control system, and the system comprises the above driverless vehicle control apparatus.

Figure 5:
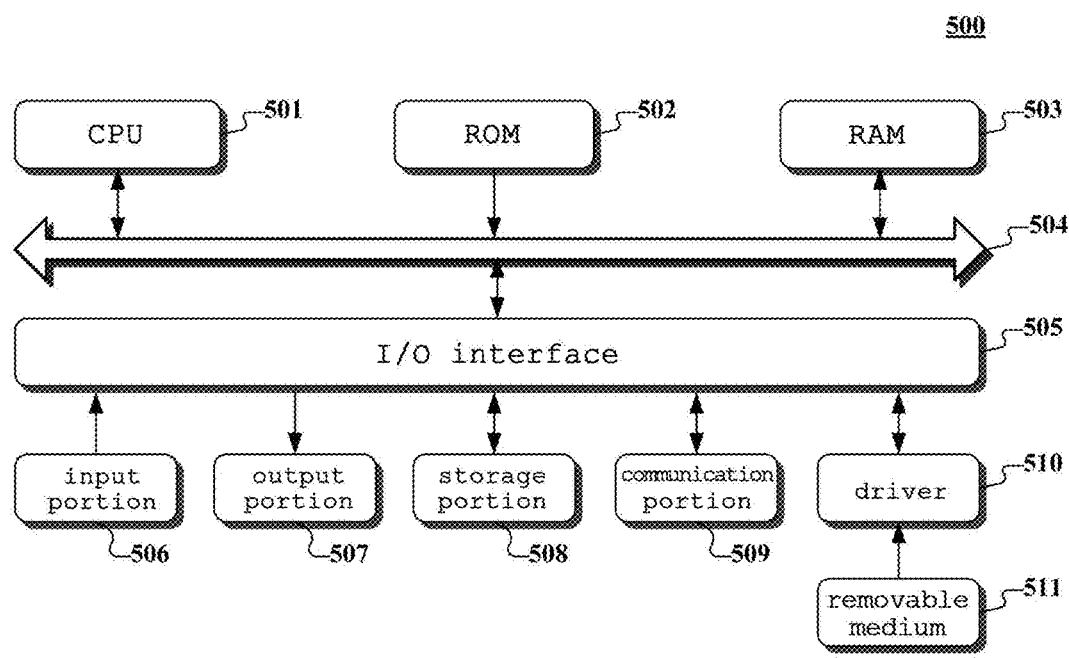
FIG. 5 is a schematic structural diagram of an embodiment of a server according to the present application.

Referring to FIG. 5, a schematic structural diagram of a computer system 500 adapted to implement a driverless vehicle control apparatus of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the above flowcharts may be implemented in a computer software program. For example, an embodiment of the present disclosure includes a computer program product, which comprises a computer program that is tangibly embedded in a machine-readable medium. The computer program comprises program codes for executing the method of the above flowcharts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a vehicle control message receiving unit, a vehicle control protocol message converting unit, a vehicle control command generating unit, and a vehicle control unit, where the names of these units or modules are not considered as a limitation to the units or modules. For example, the vehicle control unit may also be described as "a unit for controlling a driverless vehicle.

In another aspect, some embodiments of the present application further provide a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is used for: receiving a vehicle control message of a driverless vehicle, the vehicle control message used to represent vehicle control characteristics of the driverless vehicle; converting the vehicle control message to a vehicle control protocol message, the vehicle control protocol message used to implement a general instruction description for the vehicle control message; generating a vehicle control command based on the vehicle control protocol message; and converting the vehicle control command to a vehicle control instruction corresponding to the vehicle control message, and sending the vehicle control instruction to the driverless vehicle.

The foregoing is a description of some embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A driverless vehicle control method for controlling the driverless vehicle by using a general message instruction, comprising:

receiving a vehicle control message of a driverless vehicle from the driverless vehicle, the vehicle control message used to represent vehicle control characteristics of the driverless vehicle;

converting the vehicle control message to a vehicle control protocol message, the vehicle control protocol message used to implement a general instruction description for the vehicle control message;

generating a vehicle control command based on the vehicle control protocol message; and converting the vehicle control command to a vehicle control instruction corresponding to the vehicle control message, and sending the vehicle control instruction to the driverless vehicle by:

parsing the vehicle control message to obtain a message information file, the message information file comprising message content information and signal information; and inputting the message information file and a target code frame template to a code generator, to obtain a vehicle control protocol message corresponding to the message information file, the target code frame template used to convert a code format of the message information file to a target code format, and the code generator used to implement mutual conversion between the message information file and the vehicle control protocol message, wherein the code generator is generated by:

determining vehicle physical control information of the message information file;

converting the vehicle physical control information to a message code in a designated format by using a target code frame template, the message code used to construct the vehicle control protocol message; and establishing a corresponding relationship between the message information file and the message code, to obtain the code generator.

2. The method according to claim 1, wherein the parsing the vehicle control message to obtain a message information file comprises:
  detecting a file format of the vehicle control message; and
  decoding the file format to obtain the message information file corresponding to the vehicle control message.

3. The method according to claim 1, wherein attributes of the message code comprise at least one of an encoding type, a variable type, a data type, a data offset and a data resolution.

4. The method according to claim 1, wherein the generating a code generator comprises:
  parsing the vehicle control message to obtain a protocol identification, a protocol name, and detailed information of a signal in the protocol;
  acquiring vehicle model information of the driverless vehicle;
  obtaining a function definition of a message signal, information that needs to be implemented, and note information based on the protocol identification, the protocol name, the detailed information of the signal in the protocol, and the vehicle model information according to the target code frame template; and
  generating a makefile on the basis of the message signal, the information that needs to be implemented, and the note information; and
  using the makefile as the code generator.

5. A driverless vehicle control apparatus for controlling the driverless vehicle by using a general message instruction, comprising:
  a vehicle control message receiving unit, for receiving a vehicle control message of a driverless vehicle from the driverless vehicle, the vehicle control message used to represent vehicle control characteristics of the driverless vehicle;
  a vehicle control protocol message converting unit, for converting the vehicle control message to a vehicle control protocol message, the vehicle control protocol message used to implement a general instruction description for the vehicle control message;
  a vehicle control command generating unit, for generating a vehicle control command based on the vehicle control protocol message; and
  a vehicle control unit, for converting the vehicle control command to a vehicle control instruction corresponding to the vehicle control message, and sending the vehicle control instruction to the driverless vehicle;
  wherein the vehicle control protocol message converting unit comprises:
    a message information file acquiring sub-unit, for parsing the vehicle control message to obtain a message information file, the message information file comprising message content information and signal information; and
    a vehicle control protocol message converting sub-unit, for inputting the message information file and a target code frame template to a code generator, to obtain a vehicle control protocol message corresponding to the message information file, the target code from template used to convert a code format of the message information file to a target code format, and the code generator used to implement mutual conversion between the message information file and the vehicle control protocol message; and
  the apparatus comprises a code generator generating unit, for generating the code generator, comprising:
    a parsing sub-unit, for acquiring a vehicle control message of the driverless vehicle, and parsing the vehicle control message to obtain a message information file;
    a vehicle physical control information acquiring sub-unit, for determining vehicle physical control information of the message information file;
    a message code converting sub-unit, for converting the vehicle physical control information to a message code in a designated format by using a target code frame template, the message code used to construct the vehicle control protocol message; and
    a code conversion template generating sub-unit, for establishing a corresponding relationship between the message information file and the message code, to obtain the code generator.

6. The apparatus according to claim 5, wherein the message information file acquiring sub-unit comprises:
  a format detecting module, for detecting a file format of the vehicle control message; and
  a decoding module, for decoding the file format to obtain the message information file corresponding to the vehicle control message.

7. The apparatus according to claim 6, wherein attributes of the message code comprises at least one of an encoding type, a variable type, a data type, a data offset and a data resolution.

8. A non-transitory storage medium storing one or more programs, the one or more programs when executed by an apparatus, causing the apparatus to perform a driverless vehicle control method for controlling the driverless vehicle by using a general message instruction, comprising:
  receiving a vehicle control message of a driverless vehicle, from the driverless vehicle, the vehicle control message used to represent vehicle control characteristics of the driverless vehicle;
  converting the vehicle control message to a vehicle control protocol message, the vehicle control protocol message used to implement a general instruction description for the vehicle control message;
  generating a vehicle control command based on the vehicle control protocol message; and
  converting the vehicle control command to a vehicle control instruction corresponding to the vehicle control message, and sending the vehicle control instruction to the driverless vehicle;
  wherein the converting the vehicle control message to a vehicle control protocol message comprises:
    parsing the vehicle control message to obtain a message information file, the message information file comprising message content information and signal information; and
    inputting the message information file and a target code frame template to a code generator, to obtain a vehicle control protocol message corresponding to the message information file, the target code frame template used to convert a code format of the message information file to a target code format, and the code generator used to implement mutual conversion between the message information file and the vehicle control protocol message; and
  wherein the method further comprises generating the code generator by:
    determining vehicle physical control information of the message information file;
    converting the vehicle physical control information to a message code in a designated format by using a target code frame template, the message code used to construct the vehicle control protocol message; and establishing a corresponding relationship between the message information file and the message code, to obtain the code generator.

* * * * *